United States Patent [19]
Carmien

[11] Patent Number: 5,804,012
[45] Date of Patent: Sep. 8, 1998

[54] PROCESS FOR MANUFACTURING A FILAMENT WOUND, LOCALIZED STRENGTH TOOL HANDLE

[76] Inventor: Joseph Allen Carmien, 525 N. Maple Dr., Beverly Hills, Calif. 90210

[21] Appl. No.: 781,360

[22] Filed: Jan. 21, 1997

[51] Int. Cl.$^6$ .............................. B65H 81/00; B25G 1/01; B25G 3/00; B32B 31/00
[52] U.S. Cl. ...................... 156/172; 16/110 R; 16/111 R; 81/900; 156/169; 156/242; 294/57
[58] Field of Search .................................... 156/172, 245, 156/242, 169, 166, 180; 16/110 R, 111 R; 294/57; 30/341; 81/20, 22, 900; 473/561, 562; 403/265

[56] References Cited

U.S. PATENT DOCUMENTS

| | | |
|---|---|---|
| Re. 32,364 | 2/1987 | Carmien . |
| 3,712,659 | 1/1973 | Kneissl ................... 16/110 R |
| 4,084,818 | 4/1978 | Goupil et al. ............ 473/561 |
| 4,555,113 | 11/1985 | Shimazaki et al. ........ 156/172 X |
| 4,570,988 | 2/1986 | Carmien . |
| 4,605,254 | 8/1986 | Carmien . |
| 5,031,272 | 7/1991 | Carmien . |
| 5,056,381 | 10/1991 | Carmien . |
| 5,123,304 | 6/1992 | Carmien . |
| 5,211,669 | 5/1993 | Bonnes et al. .......... 16/110 R |
| 5,213,014 | 5/1993 | Carmien . |
| 5,262,113 | 11/1993 | Carmien . |
| 5,303,916 | 4/1994 | Rodgers ............... 473/562 X |
| 5,310,230 | 5/1994 | Carmien . |
| 5,375,486 | 12/1994 | Carmien . |
| 5,404,616 | 4/1995 | Carmien . |
| 5,408,902 | 4/1995 | Burnett ................... 81/22 |
| 5,421,931 | 6/1995 | Carmien . |
| 5,458,840 | 10/1995 | Carmien . |
| 5,493,758 | 2/1996 | Carmien . |
| 5,496,015 | 3/1996 | Carmien . |
| 5,540,472 | 7/1996 | Dunlap ................... 294/57 |
| 5,636,836 | 6/1997 | Carroll et al. .......... 473/561 |

FOREIGN PATENT DOCUMENTS

| | | | |
|---|---|---|---|
| 2842035 | 4/1980 | Germany ............ | 16/110 R |
| 1446332 | 8/1976 | United Kingdom ... | 16/110 R |

*Primary Examiner*—Jeff H. Aftergut
*Attorney, Agent, or Firm*—Kelly Bauersfeld Lowry & Kelley, LLP

[57] ABSTRACT

In a process for manufacturing a handle for a hand tool, resin-coated fibers are pultruded to form an elongate, substantially hollow fiber-resin composite rod having a first end for attachment to a tool head. A glass filament is wound about a longitudinal axis of the composite rod adjacent to the rod's first end, after which an encasement over the filament is molded onto the rod. For increased strength, the filament may be first coated with a thermo-setting resin and, after wrapping the filament about the rod, the resin is cured prior to the molding step. The resultant tool handle, particularly useful in applications with, for example, lopping shears, may be very lightweight and yet exhibit superior strength characteristics in comparison with standard composite handles manufactured in a pultrusion manufacturing process. Preferably the resultant tool handle includes a substantially hollow core that extends the length of the handle, core includes a lightweight filler extending along a first portion thereof and a relatively strong reinforcing section extending along a second portion. The reinforcing section is located adjacent to the first end of the rod that is intended to withstand greater stress than the remainder of the handle.

19 Claims, 2 Drawing Sheets

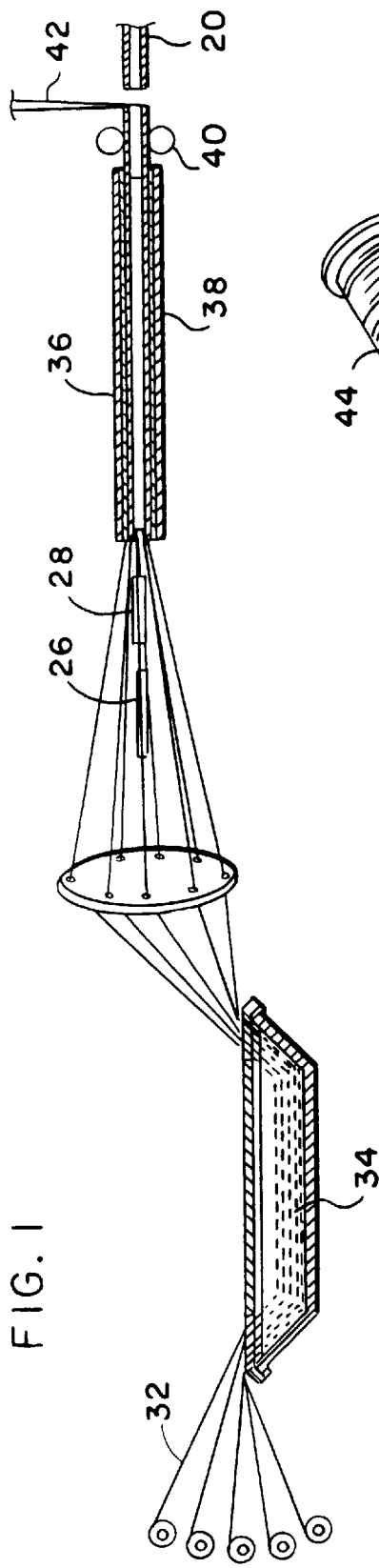
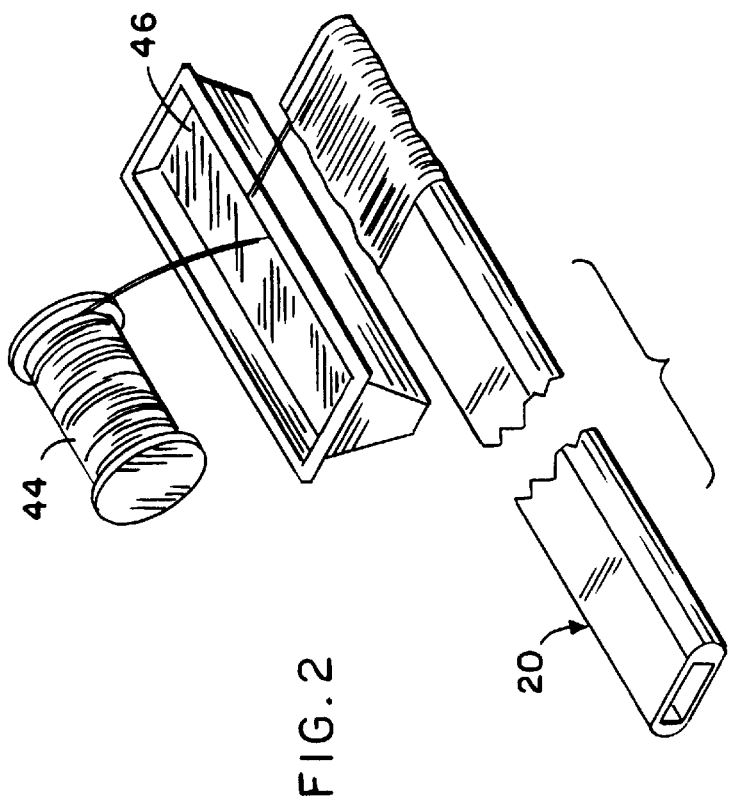
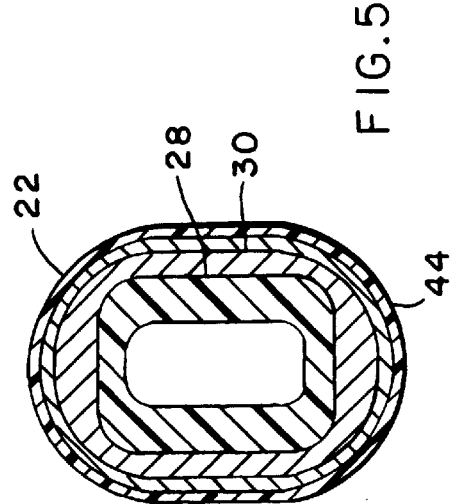
FIG. 1
FIG. 2
FIG. 5

PROCESS FOR MANUFACTURING A FILAMENT WOUND, LOCALIZED STRENGTH TOOL HANDLE

BACKGROUND OF THE INVENTION

This invention relates to fiber-resin composite pultrusion methods and products. More particularly, the present invention relates to composite tool handles and the like having a construction which significantly increases the localized strength characteristics of such handles without a significant corresponding increase in weight.

In manufacturing a handle for a hand tool such as a shovel, a variety of competing design considerations are at stake. On the one hand, it is desirable to have a handle that is as light as possible, to provide for easy use by consumers. On the other hand, the handle must have the structural integrity to withstand the variety of stresses that will be placed on it. Wooden handles have been widely used in the past, but provide an often unacceptable compromise of weight versus structural integrity.

An alternative to wooden handles is the use of rods formed from resin coated fibers. The basic technique for running filaments through a resin bath and then through an elongated heated die tube to produce a cured composite rod of the same shape as the die tube has been known for some time. See, for example, U.S. Pat. Nos. 2,948,649 and 3,556,888. This method, however, produces a solid extruded product which is unacceptably heavy and/or too rigid for many tool handle applications.

The weight problem can be alleviated by means of an existing process to extrude hollow tubes utilizing a die tube with the center filled, leaving an annular cross-section through which the resin coated fibers are pulled. This weight reduction is achieved, however, at the cost of significantly reduced bending or flexural strength in comparison with a solid rod, resulting in a tool handle which would not be suitable for use in certain high-stress applications such as general purpose shovel handles. Further, to increase interlaminar strength of the tube forming fibers, a substantial percentage of fibers running other than in a longitudinal direction have been thought to be required.

The bending strength of tool handles can be improved by producing fiber-resin rods which are substantially hollow or lightweight throughout a major portion of their length, but reinforced at areas of expected high stresses during tool use. Such improved tool handles and related methods are shown in U.S. Pat. No. 4,570,988, the contents of which are incorporated herein by reference. These composite tool handles have further been improved by the introduction of one or more reinforcing beads of fiber-resin material extending the length of the load-bearing rod.

Such tool handles are shown in U.S. Pat. No. 4,605,254, the contents of which are incorporated herein by reference.

Although such above-described composite tool handles are generally superior to wooden handles, the competitive pressures of the marketplace have encouraged tool handle manufacturers to seek new processes, materials and construction techniques to further increase the strength of composite tool handles without introducing additional weight and/or cost to the handle. In this regard, it is important to permit use of the most economical glass fibers and the most reasonably priced resins to produce a product that has the greatest value to the end user. However, common glass fibers and resins have physical properties which are often less desirable when utilized in a composite tool handle than other more exotic and costly fibers and resins.

Accordingly, one objective is to obtain higher mechanical strength properties in a composite material tool handle while permitting the manufacturer to use relatively less costly fiber and resin materials.

A lopping shear with, for example, twenty-two inch (22") long handles is about the most demanding cantilevered-type tool in popular use. Loading on the handles of a lopping shear is only limited by the upper body strength of the user. Failure in such tool handles typically occurs at or near the junction of a tool tang and the handle. The remainder of the handle, from two or three inches away from the end of the tang to the butt end seldom if ever fails, but must include enough mass to be comfortable to hold by a user.

A study of cantilevered tool handles that have failed indicates where, why and what kind of strength is needed in such handles. In particular, the strength required of the handle diminishes in a straight-lined curve from the connection to the tang, to the butt end. The butt end of the handle, however, must be of adequate size to be comfortable to be gripped by the user. When wood is utilized, the handle is typically attached by slotting the shaft so that the metal tang of a shear can be inserted. Afterwards, holes are drilled through the assembly and rivets or bolts fix the assembly together. By slotting the wood and then drilling the holes, the shaft is weakened by at least the value of the cross section removed. Moreover, the mode of failure is almost always (unless it is a faulty-grained shaft of wood) in and around the attachment. Sometimes the metal tang breaks at the point where it had been drilled to accept the bolt or rivet.

By studying test data it has become apparent that (a) bulk is required at the position of the handle which is to be grasped, but high-strength is not needed at such locations, (b) shaft strength should be at its highest (as required) at or around the tang attachment area, but can be substantially reduced progressively towards the grip, and (c) because such tools are often held up during use, as in the case of lopping shears, weight is an important consideration, and thus weight in the butt-end of handle is undesirable.

Accordingly, it is desirable that an improved tool handle for use in connection with cantelevered-type tools be provided which is capable of eliminating any holes in the tang and/or handle shaft to maximize the strength of each component at the point of attachment between the tool head and the tool handle. Further, attachment must be effective without degrading either the tang or shaft, and/or affecting the cosmetics or style of the resultant tool. It is preferred that a lightweight shaft be provided with an ergonomic design in the grip area and which has increased shaft strength far superior to that available with present wood and/or composite tool handles. The present invention fulfills these needs and provides other related advantages.

SUMMARY OF THE INVENTION

The present invention resides in a process for manufacturing a hand tool, and the resultant filament wound, localized strength tool handle. Such tool handles are particularly useful in applications where the weight of the handle must be reduced to an absolute minimum while providing superior strength characteristics at the attachment point between the handle and the tool head as in, for example, lopping shears.

In a preferred form of the invention, a pultrusion process is utilized to form an elongate substantially hollow fiber-resin composite rod having an end segment for receiving a mounting tang of a tool head. The pultrusion process includes the steps of alternately feeding sections of lightweight core and relatively strong reinforcing core into the center of the pultrusion die tube. The core sections are then surrounded with resin-coated fibers as they are pulled through the pultrusion die tube. Within the pultrusion die tube the resin-coated fibers are cured about the core sections to form a bond therewith. Preferably, the lightweight core comprises hollow tubing and the reinforcing core is positioned adjacent to the lightweight core and is at least coextensive with the rod end segment to increase the strength of the rod at a critical stress point.

A glass filament is then wound perpendicularly about a longitudinal axis of the rod over the rod end segment. An encasement is molded onto the rod over the filament, and a grip is molded over an opposite end of the rod.

For increased strength, the glass filament may first be coated with a resin prior to winding it about the rod. In this case, the resin is cured prior to the molding step.

The resultant tool handle comprises an elongate, substantially hollow core having a lightweight filler extending along a first portion of the predetermined length and a relatively strong reinforcing section extending along a second portion of the length. The first and second portions extend alternately longitudinally along the length of the tool handle such that the reinforcing section of the core is located adjacent to a first end of the tool handle where it is intended to withstand greater stress than the remainder of the handle. A generally tubular jacket of fiber-resin material is formed about the core, and a glass filament is wound about a longitudinal axis of the jacket adjacent to the first end thereof. The filament is sealed between the jacket and an encasement molded onto the jacket over the filament, and a grip is provided over a second end of the tubular jacket.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic representation of a pultrusion process adapted to provide an elongate substantially hollow fiber-resin composite rod, in accordance with the method of the present convention;

FIG. 2 is a schematic representation of winding or wrapping a resin-coated glass filament about a first end of the composite rod;

FIG. 5 is an enlarged sectional view taken generally along the line 5—5 of FIG. 4.

DETAILED DESCRIPTION OF THE PREFERRED EMBODIMENT

Figure 3:
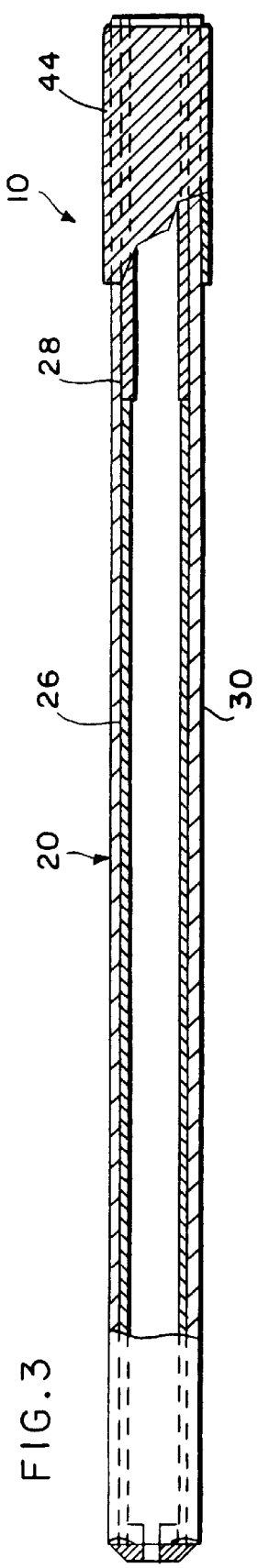
FIG. 3 is a partially sectional elevational view of a composite rod manufactured in accordance with the process of FIG. 1 and including a glass filament wound about a first end thereof in accordance with the process step of FIG. 2.
Figure 4:
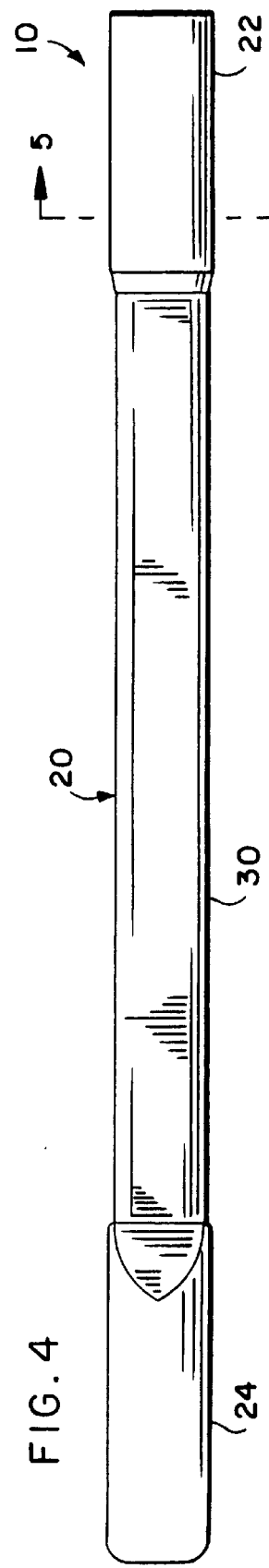
FIG. 4 is an elevational view of the rod illustrated in FIG. 3, wherein an encasement has been molded onto the composite rod over the filament at the first end of the rod, and wherein a grip has been molded over a second end of the rod.
Figure 6:
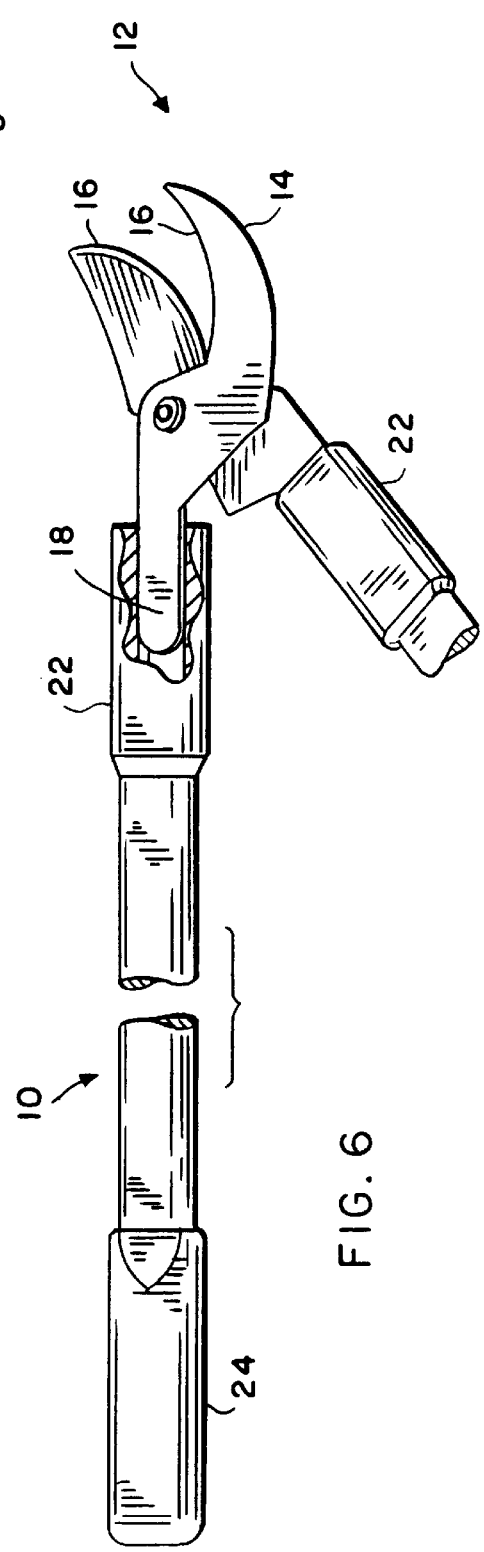
FIG. 6 is a perspective view of exemplary lopping shears utilizing tool handles manufactured in accordance with the present invention.

As shown in the drawings for purposes of illustration, the present invention is concerned with a novel composite tool handle, generally designated in the accompanying drawings by the reference number 10, and a related manufacturing process. A pair of tool handles 10 comprise components of an exemplary hand tool shown in FIG. 6 as lopping shears 12. The exemplary lopping shears 12 include a tool head 14 defined by a pair of pivotally interconnected and opposed blade members 16. The blade members 16 are connected in turn to a corresponding pair of handles 10. In this regard, the blade members 16 of the tool head 14 each include a rearwardly projecting mounting tang 18 formed typically from a tool steel in integral relation with the blade members (FIG. 6.).

In accordance with the present invention, the tool handle 10 comprises a load-bearing rod 20 having molded thereon a cosmetic ferrule 22 at a first end thereof and a grip 24 over a second end thereof. The ferrule 22 ensheaths a portion of the rod 20 that is configured to receive a mounting tang 18 of the tool head 14 therein, in the manner described in U.S. Pat. No. 5,123,304, the contents of which are incorporated herein.

The load-bearing rod 20 is manufactured by a pultrusion process (schematically illustrated in FIG. 1), and includes alternating sections of lightweight filler core 26 and a reinforcing core 28 surrounded by a cured fiber-resin jacket 30. The reinforcing core 28 is preferably located within the fiber-resin jacket 30 at or adjacent to the first end of the rod 20, where the greatest flexural stresses on the tool handle 10 are anticipated during normal tool use. The lightweight filler core 26, which may be simply hollow tubing, extends through the remainder of the load-bearing rod 20 to minimize the weight of the tool handle 10.

More particularly, the load-bearing rod 20 is manufactured by drawing a fiber material 32 through a resin bath 34 and into a die tube 36 where the fibers are heated and cured by a heating element 38 surrounding the die tube. The cured rod is pulled out of the die tube 36 by tractor-type pullers 40 and cut to the desired length by a conventional cutting device 42. As the fibers 32 enter the die tube 36, alternating sections of lightweight tubing or filler core 26 and reinforcing core 28 are inserted into the center of the die tube and are simultaneously surrounded by the fibers and drawn into and through the die tube 36. By this method a continuous load-bearing rod 20 can be quickly and easily manufactured with a reinforced section integrally included at any desired location, and for purposes of the present invention preferably at a first end thereof.

In order to greatly improve the strength characteristics of the tool handle 10 adjacent to the first end thereof, a glass filament 44 is run through a second resin bath 46 and, wound about a longitudinal axis of the rod 20 adjacent to the rod's first end. The second resin bath 46 preferably includes a thermo-setting resin such as an epoxy The resin is cured prior to molding the ferrule 22 onto the rod 20 over the glass filament windings 44.

Although the glass filament 44 comprises a bundle of extremely small threads which are very fragile and can be easily damaged, the filament typically has a high tensile strength. Further, great strength values will be realized if the individual fibers have a resin bridge to disperse the load from fiber to fiber. Therefore, to give the highest values the fibers are first coated with a thermo-setting resin in the resin bath 46 either during wrapping or thereafter, and then cured. However, many applications do not require the ultimate possible strength and, therefore, the fibers can be "dry" wrapped about the rod 20 and need only a protective covering in the form of the ferrule 22 to be molded over the windings 44 and onto the rod 20. It has been found that two layers of dry glass, cheek-wrapped glass filament 44 windings significantly improve the strength of the tool handle 10 at its attachment to the tool head 14, in connection with the exemplary lopping shears 12. In other applications, more or less layers laid on in various patterns, wetted or dry, may be employed to get the desired strength characteristics from the tool handle 10.

Following manufacture of the handle 10 as described above, it may be attached to the tool head 14 in much the same manner as described in U.S. Pat. No. 5,123,304. In particular, a mounting tang 18 may be first heated within a heating block. The first end of the tool handle 10 is then aligned with the heated mounting tang 18 to place an end of the reinforcing core 28 (and a channel provided therein) in alignment with the mounting tang 18. The tool handle 10 is then driven onto the mounting tang 18 so that the mounting tang is forced into the reinforcing core 28. The thermo plastic material of the reinforcing core 28 surrounding the tang 18 flows into intimate contact around the mounting tang and then hardens as the heat of the mounting tang is dissipated to hold it in place. Thus, no screws or rivets are required to join tool handle 10 to the tool head 14.

The resultant tool handle 10 comprises an elongate, substantially hollow core which includes the abutting filler core 26 and reinforcing core 28. A generally tubular jacket 30 a fiber-resin material is cured about the cores, and a glass filament 44 is wound about the longitudinal axis of the jacket adjacent to a first end thereof. An encasement in the form of the ferrule 22 is then molded onto the jacket 30 over the filament 44. Simultaneously, a grip 24 is molded over a second end of the tubular jacket. The glass filament 44 may be coated with a thermo-setting resin and cured over the jacket 30 if additional strength is needed adjacent to the first end of the tool handle 10.

From the foregoing it will be appreciated that the present invention provides a filament-wound, localized strength tool handle and a related manufacturing process. The features of the tool handle include a high dielectric strength, high chemical and weather resistance, infinite color and grip styling, and the ability to utilize heat drive assembly of the handle to the tang, thereby eliminating the need for bolts or rivets. The shelf life of such a tool handle 10 is essentially infinite, the color of the tool handle may be built in, thereby eliminating the need for paint or varnish, and the flexural modulus of the composite tool handle, in comparison with wood, provides superior shock absorption. Further, it should be understood that the process described above may be enhanced by combining other advanced manufacturing processes such as those shown and described in U.S. Pat. Nos. 5,262,113 and 5,421,931, the contents of which are incorporated herein.

Although a particular embodiment of the invention has been described in detail for purposes of illustration, various modifications may be made without departing from the spirit and scope of the invention. Accordingly, the invention is not to be limited, except as by the appended claims.

I claim:

1. A process for manufacturing a hand tool, comprising the steps of:
    providing an elongate substantially hollow rod having an end segment for receiving a mounting tang of a tool head;
    wrapping a filament about the rod end segment perpendicularly to a longitudinal axis of the rod;
    molding onto the rod an encasement over the filament; and
    then inserting the mounting tang into the rod end segment.

2. The process of claim 1, including the step of molding a grip over an end of the rod opposite the rod end segment.

3. The process of claim 1, wherein the providing step includes the step of pultruding resin-coated fibers to form a fiber-resin composite rod.

4. The process of claim 3, including the step of forming the fiber-resin composite rod about a lightweight core substantially its entire length, and about a reinforcing core that is adjacent to the lightweight core and is at least coextensive with the rod end segment.

5. The process of claim 4, wherein the inserting step includes the steps of heating the mounting tang, and driving the heated mounting tang into the reinforcing core.

6. The process of claim 4, wherein the pultruding step includes the steps of alternately feeding sections of lightweight core and relatively strong reinforcing core into the center of a pultrusion die tube, surrounding the core sections with resin-coated fibers, pulling the core section through the pultrusion die tube while keeping the core sections surrounded by the resin-coated fibers, and curing the resin-coated fibers about the core sections to form a bond therewith.

7. The process of claim 6, wherein the lightweight core comprises hollow tubing.

8. The process of claim 7, wherein the reinforcing core is positioned along the length of the rod to increase the strength of the rod at a critical stress point.

9. The process of claim 1, wherein the filament is a glass filament.

10. The process of claim 1, including the step of coating the filament with a resin.

11. The process of claim 10, wherein the filament is coated with a thermol-setting resin prior to the wrapping step.

12. The process of claim 11, including the step of curing the resin prior to the molding step.

13. A process for manufacturing a hand tool, comprising the steps of:
    pultruding resin-coated fibers to form an elongate substantially hollow fiber-resin composite rod having an end segment for receiving a mounting tang of a tool head;
    winding a glass filament about the rod end segment perpendicularly to a longitudinal axis of the rod;
    molding onto the rod an encasement over the filament; and
    then inserting the mounting tang in to the rod end segment.

14. The process of claim 13, wherein the pultruding step includes the step of forming the fiber-composite rod about a lightweight core substantially its entire length, and about a reinforcing core that is adjacent to the lightweight core and is at least coextensive with the rod end segment.

15. The process of claim 14, wherein the pultruding step includes the steps of alternately feeding sections of lightweight core and relatively strong reinforcing core into the center of a pultrusion die tube, surrounding the core sections with resin-coated fibers, pulling the core sections through the pultrusion die tube while keeping the core sections surrounded by the resin-coated fibers, and curing the resin-coated fibers about the core sections to form a bond therewith, wherein the lightweight core comprises hollow tubing, and the reinforcing core is positioned along the length of the rod to increase the strength of the rod at a critical stress point.

16. The process of claim 14, wherein the inserting step includes the steps of heating the mounting tang, and driving the heated mounting tang into the reinforcing core.

17. The process of claim 13, including the steps of coating the filament with a thermol-setting resin prior to the winding step, and curing the resin prior to the molding step.

18. A process for manufacturing a hand tool, comprising the steps of:

pultruding resin-coated fibers to form an elongate substantially hollow fiber-resin composite rod having an end segment for receiving a mounting tang of a tool head, wherein the fiber-resin composite rod is formed about a lightweight core substantially its entire length, and about a reinforcing core that is adjacent to the lightweight core and is at least coextensive with the rod end segment;

coating a high tensile strength filament with a thermo-setting resin;

winding the filament about the rod end segment perpendicularly to a longitudinal axis of the rod;

curing the resin which coats the high tensile strength and wound filament;

molding onto the rod an encasement over the filament; and then inserting the mounting tang into the rod end segment.

19. The process of claim 18, wherein the inserting step includes the steps of heating the mounting tang, and driving the heated mounting tang into the reinforcing core.

\* \* \* \* \*